United States Patent
Li et al.

(10) Patent No.: US 10,990,290 B2
(45) Date of Patent: Apr. 27, 2021

(54) HIGH-VOLUME, LOW-LATENCY DATA PROCESSING IN FLEXIBLY CONFIGURED LOCAL HETEROGENEOUS COMPUTING ENVIRONMENTS

(71) Applicant: Alibaba Group Holding Limited, George Town (KY)

(72) Inventors: Shu Li, Bothell, WA (US); Ping Zhou, Folsom, CA (US)

(73) Assignee: Alibaba Group Holding Limited

( * ) Notice: Subject to any disclaimer, the term of this patent is extended or adjusted under 35 U.S.C. 154(b) by 17 days.

(21) Appl. No.: 15/595,472

(22) Filed: May 15, 2017

(65) Prior Publication Data
US 2018/0329632 A1    Nov. 15, 2018

(51) Int. Cl.
| | | |
|---|---|---|
| *G06F 3/06* | (2006.01) | |
| *G06F 9/44* | (2018.01) | |
| *G06F 12/1009* | (2016.01) | |
| *G06F 9/4401* | (2018.01) | |
| *G06F 8/61* | (2018.01) | |
| *G06F 9/50* | (2006.01) | |
| *G06F 8/654* | (2018.01) | |
| *G06F 12/02* | (2006.01) | |

(52) U.S. Cl.
CPC ............ *G06F 3/0611* (2013.01); *G06F 3/065* (2013.01); *G06F 3/0688* (2013.01); *G06F 8/63* (2013.01); *G06F 8/654* (2018.02); *G06F 9/441* (2013.01); *G06F 9/5005* (2013.01); *G06F 9/5077* (2013.01); *G06F 12/0246* (2013.01); *G06F 12/1009* (2013.01); *G06F 2212/1024* (2013.01); *G06F 2212/65* (2013.01); *G06F 2212/7201* (2013.01); *G06F 2212/7208* (2013.01)

(58) Field of Classification Search
CPC ...... G06F 3/065; G06F 3/0688; G06F 3/0611; G06F 9/441; G06F 12/1009
USPC ......................................................... 711/103
See application file for complete search history.

(56) References Cited

U.S. PATENT DOCUMENTS

| | | | |
|---|---|---|---|
| 5,343,406 A | 8/1994 | Freeman | |
| 5,781,756 A | 7/1998 | Hung | |
| 6,150,838 A | 11/2000 | Wittig | |
| 6,898,705 B2 * | 5/2005 | Abboud | G06F 9/4406 709/215 |
| 7,498,835 B1 * | 3/2009 | Rahman | H03K 19/17772 326/38 |
| 7,856,546 B2 | 12/2010 | Casselman | |
| 8,433,845 B2 | 4/2013 | Borchers | |

(Continued)

OTHER PUBLICATIONS

Ngai et al. "An SRAM-programmable field-configurable memory." Custom Integrated Circuits Conference, 1995., Proceedings of the IEEE 1995. IEEE, 1995.

*Primary Examiner* — Tuan V Thai
*Assistant Examiner* — Edward Waddy, Jr.
(74) *Attorney, Agent, or Firm* — Van Pelt, Yi & James LLP

(57) ABSTRACT

Resource management includes: operating in a first mode, including executing a controller operation in connection with a plurality of local elements, wherein the controller operation is executed by a configurable resource; switching from the first mode to a second mode; and operating in the second mode, including: executing a data processing task in a first portion of the configurable resource; and executing the controller operation in connection with the plurality of local elements, in a second portion of the configurable resource.

26 Claims, 12 Drawing Sheets

(56) References Cited

U.S. PATENT DOCUMENTS

| | | | |
|---|---|---|---|
| 9,071,246 B2 | 6/2015 | Subramaniam | |
| 9,348,795 B1 | 5/2016 | Langhammer | |
| 9,990,505 B2* | 6/2018 | Uner | G06F 21/604 |
| 2006/0236079 A1* | 10/2006 | Lin | G06F 9/3891 |
| | | | 712/229 |
| 2014/0129753 A1 | 5/2014 | Schuette | |
| 2014/0317627 A1* | 10/2014 | Jin | G06F 9/30134 |
| | | | 718/102 |
| 2015/0269377 A1 | 9/2015 | Gaddipati | |
| 2016/0070652 A1* | 3/2016 | Sundararaman | G06F 3/065 |
| | | | 711/154 |
| 2018/0165032 A1* | 6/2018 | Bandic | G06F 3/0608 |

* cited by examiner

HIGH-VOLUME, LOW-LATENCY DATA PROCESSING IN FLEXIBLY CONFIGURED LOCAL HETEROGENEOUS COMPUTING ENVIRONMENTS

BACKGROUND OF THE INVENTION

Data processing (such as data extraction and identification, data analytics and forecasting, etc.) is an important aspect of modern computing environments. On Internet-based application platforms such as search, e-commerce, finance, medical, security, and many others, vast amounts of data needs to be processed offline as well as online.

Currently, in order to handle the high volume of data, modern computing environments (e.g., cloud-based computing environments) typically employ specialized clusters of hardware and software to perform specific functions. Data is transmitted via a high-speed fabric between different clusters that accomplish specialized tasks. For example, data can be inspected by networking clusters, sent to computing clusters to be processed, and then sent to storage clusters to be stored. As the volume of data increases, a greater amount of data fabric is required, and the infrastructure must be expanded to accommodate the requirement. Further, data latency will often increase as more data is transmitted. Additionally, due to the increase in intermediate data generated by the specialized clusters, the clusters may need to be modified to include additional storage capacity, which adds to the cost. How to efficiently manage the processing of high volume of data without substantially increasing latency is becoming an ever more pressing issue.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Flexibly configuring resources in a system that is capable of processing high volumes of data is disclosed. In various embodiments described herein, the systems are configured to: operate in a first mode, including executing a controller operation in connection with a plurality of local elements, wherein the controller operation is executed by a configurable resource; switch from the first mode to a second mode; and operate in the second mode, including: executing a data processing task in a first portion of the configurable resource; and executing the controller operation in connection with the plurality of local elements, in a second portion of the configurable resource.

Figure 1:
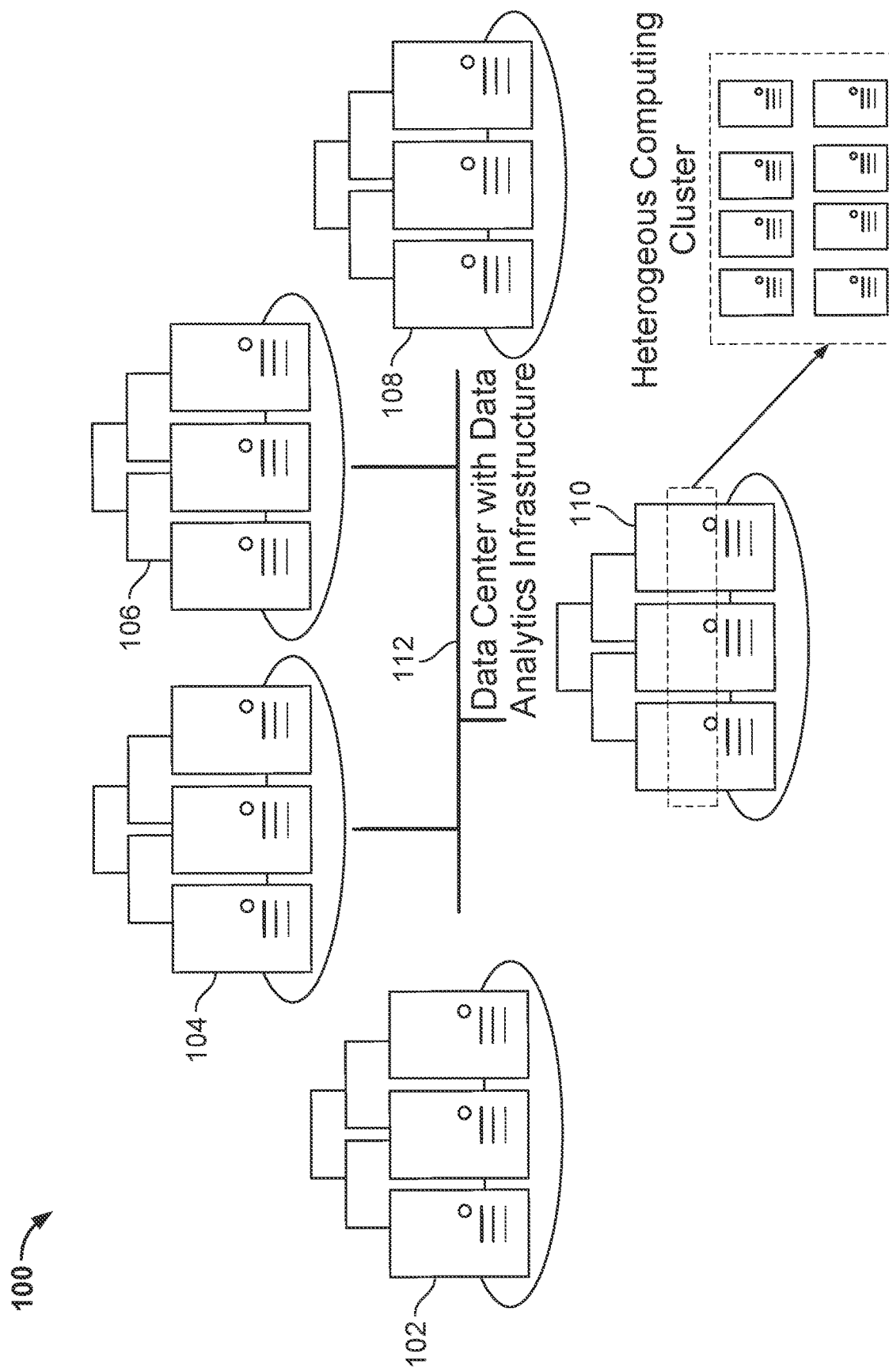
FIG. 1 is a block diagram illustrating an example of a heterogeneous computing cluster in a data center.

FIG. 1 is a block diagram illustrating an example of a heterogeneous computing cluster in a data center. In this example, data center 100 includes a number of clusters (102-110). Specifically, cluster 110 is a heterogeneous computing cluster comprising various computing elements such as central processing units (CPUs), graphic processing units (GPUs), tensor processing units (TPUs), field programmable gate arrays (FPGAs), etc. This cluster is configured to perform data processing functions.

Clusters 102-108 are configured to perform other specialized data handling functions unrelated to data analytics, such as data storage, network processing, etc. A high volume of data is transferred from clusters 102-108 to heterogeneous computing cluster 110 via network fabric 112 for the heterogeneous computing cluster to perform data processing functions such as data analytics. The processing results are transferred back to clusters 102-108 as needed. The data transfer between clusters often requires bandwidth in the hundred-megabit or gigabit range. Thus, for computing cluster 110 to process a high volume of data sent by other clusters, the load on network fabric 112 can be substantial.

Figure 2:
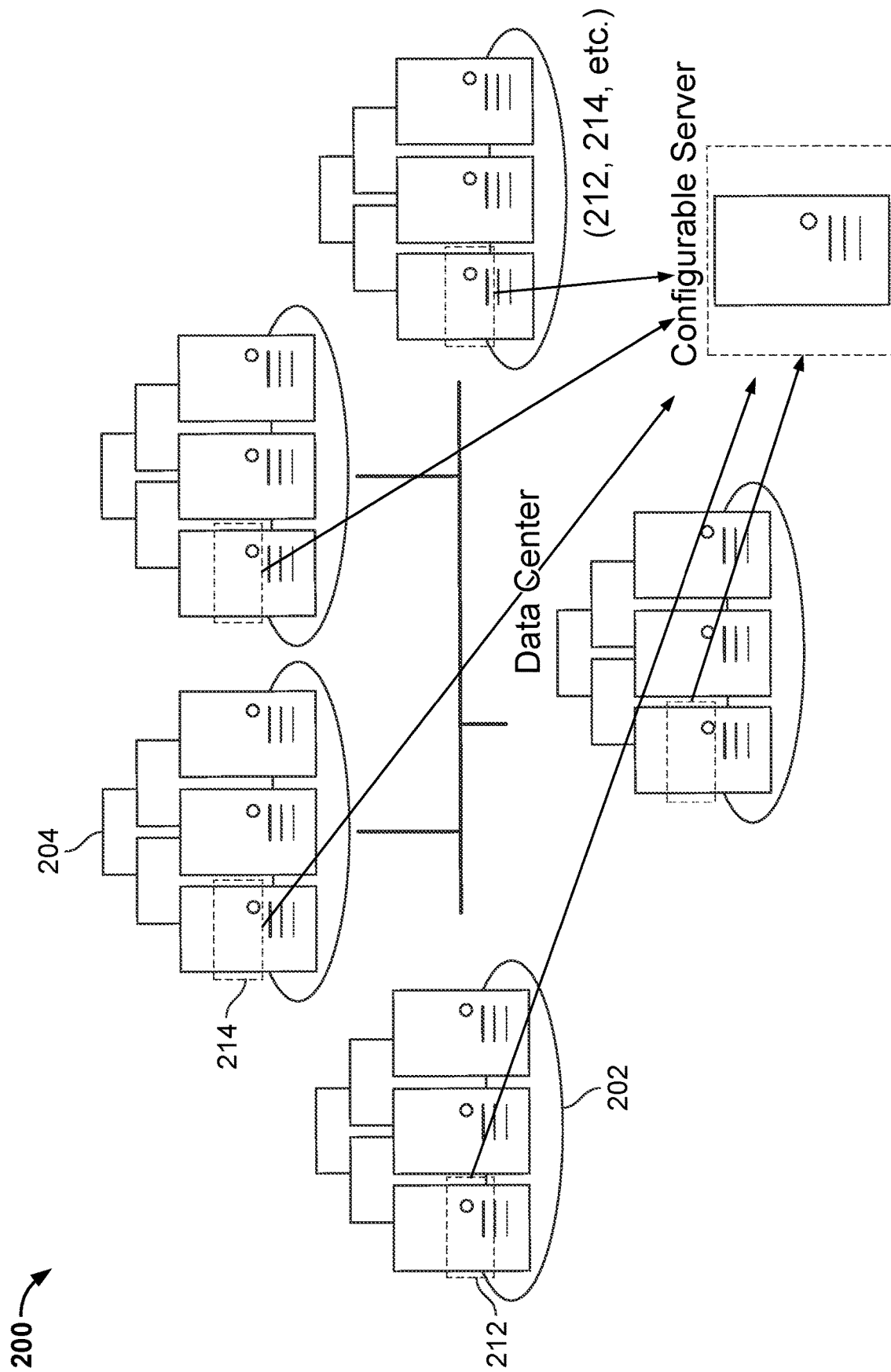
FIG. 2 is a block diagram illustrating an embodiment of a configurable architecture deployed in a network.

To alleviate bandwidth pressure on the network fabric, configurable architectures for high-volume data processing are developed. FIG. 2 is a block diagram illustrating an embodiment of a configurable architecture deployed in a network. System 200 can be deployed on a data center, an enterprise network, or any other appropriate large scale network. Within a cluster such as 202, 204, etc., there is one or more configurable multi-function devices 212, 214, etc. As will be described in greater detail below, embodiments of configurable multi-function devices have multiple modes of operations. In a dedicated mode, a configurable multi-function device is configured to fully utilize the certain resources such as logic cells, memory, etc. to perform specialized data handling functions such as data storage, network processing, etc. When data is to be processed, the configurable multi-function device switches to a shared mode where the resources are shared between the specialized data handling functions and data processing functions such as data analytics. Preferably, a configurable multi-function device performs data handling and/or data processing functions on its local data, thus avoiding having to move large volumes of data between clusters. The cost of maintaining a data center with such data clusters is therefore significantly reduced.

Figure 3A:
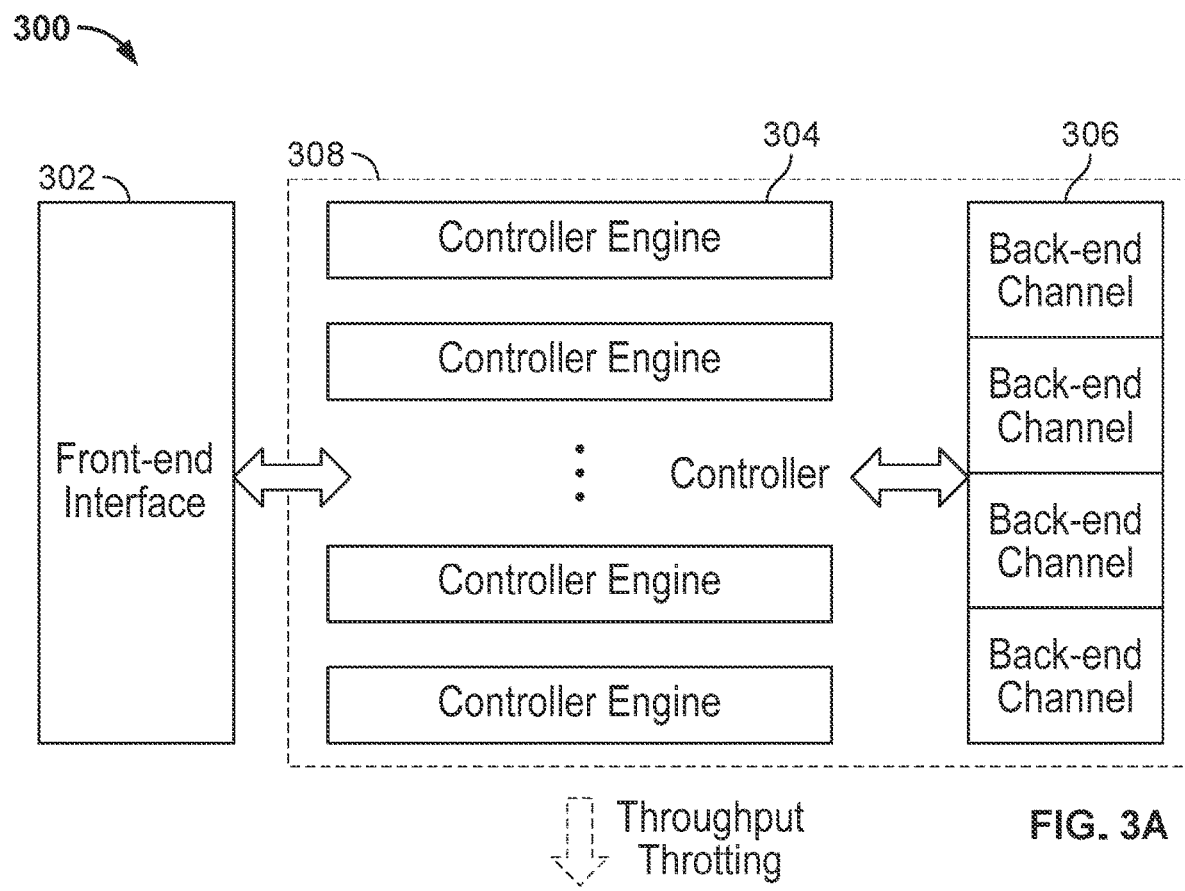
FIG. 3A illustrates the resource allocation of the embodiment of the configurable multi-function device in a dedicated mode.
Figure 3B:
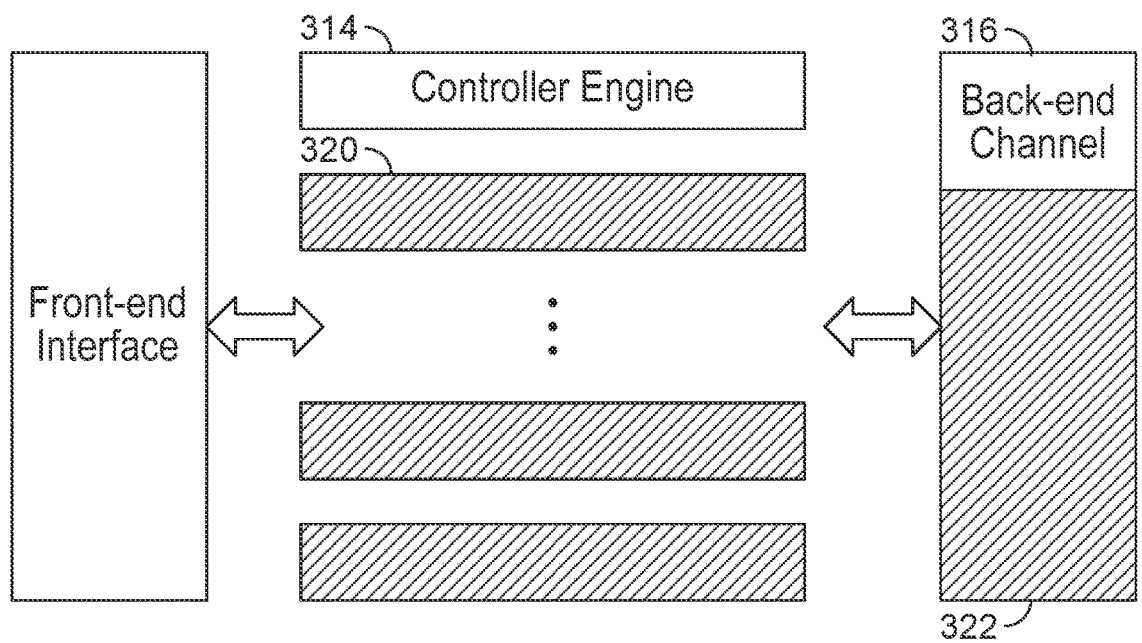
FIG. 3B illustrates the device in a shared mode.

FIGS. 3A and 3B are block diagrams illustrating resource allocations of an embodiment of a configurable multi-function device in different modes. In this example, the logical components of the device in a dedicated mode and a shared mode are illustrated.

FIG. 3A illustrates the resource allocation of the embodiment of the configurable multi-function device in a dedicated mode. As shown, configurable multi-function device 300 includes a front-end interface 302, a plurality of controller engines 304, and a plurality of back-end channels (also referred to as back-end interfaces) 306.

Front-end interface 302 can be implemented using one or more PCIe buses, one or more microprocessors, one or more microcontrollers, any other appropriate hardware, software, firmware, or a combination thereof. Front-end interface 302 connects device 300 with one or more other devices (e.g., the CPU of a host system that device 300 is a part of, an external system, etc.) and facilitates communication between device 300 and the other devices. In particular, front-end interface 302 facilitates communication between one or more other devices and a controller 308 within the configurable multi-function device. For example, the front-end interface can receive a request from a host, send the request to the controller, receive results from the controller, and send the results to the host.

The configurable resource in this example includes configurable logic cells such as FPGA cells, CPLD cells, etc., as well as DRAM as appropriate. Controller 308 includes controller engines 304 and back-end channels 306, both of which can be implemented using configurable logic such as FPGA, CPLD, or the like. In some embodiments, the controller engines and/or back-end channels also include memory elements such as DRAM. Controller engines 304 are configured to manage the functions of the local elements by performing various controller functions such as read/write/reset, memory management, garbage collection, etc. The controller engines in this example are implemented using FPGAs, and instances of the controller engines are configured to operate independently. Back-end channels 306 are configured to connect controller engines 304 with local elements (not shown) such as NAND dies, network processors, etc., located on the same device. Back-end channels 306 are implemented using FPGAs, and are configured to perform functions such as multiplexing.

In the dedicated mode, the configurable resource within the device is used to implement a full set of controller engines 304 and back-end channels 306 for performing controller functions. In this mode, the configurable multi-function device performs data storage, networking, or other specialized data handling operations for which the device is designed. Other data processing functions such as data analytics are not implemented and therefore not performed on the device in this mode.

When additional data processing, in particular, computation-intensive analytics functions such as image recognition, speech recognition, language translation, search indexing, etc., need to be performed, the configurable multi-function device switches into the shared mode, where a portion of the configurable resource in the device is used to perform controller functions, and another portion of the configurable resource in the device is used to facilitate the data processing operations.

FIG. 3B illustrates the device in a shared mode. In this example, a portion of the configurable resource is configured as controller engines and back-end channels and (shown as 314 and 316) performs controller functions. Another portion of the configurable resource (the hashed parts 320 and 322) is configured to perform one or more data processing tasks comprising one or more data processing operations. Specifically, data processing task implementation (e.g., synthesized FPGA logic and/or firmware code) is loaded from a storage location and used to reprogram the FPGA and/or firmware to implement the data processing tasks. In this mode, a tradeoff is made between the data throughput of the local elements and the overall data processing efficiency. Put another way, the throughput of the specialized function (e.g., data storage or network processing) is throttled and resources are diverted from the controller to perform data processing. Specifically, data throughput for the local elements is reduced since there are fewer control engines and back-end channels to support data access to and from the local elements, but the overall processing efficiency is improved and the network load is reduced because the data being processed is preferably local to the configurable multi-function device (e.g., on the same card). For example, in the case of image recognition, the images being recognized are stored locally at the configurable multi-function device. Through the use of the flexible configurable server, the images do not have to be transferred to a separate computing cluster over the network to be processed for recognition, and network bandwidth is conserved.

Figure 4A:
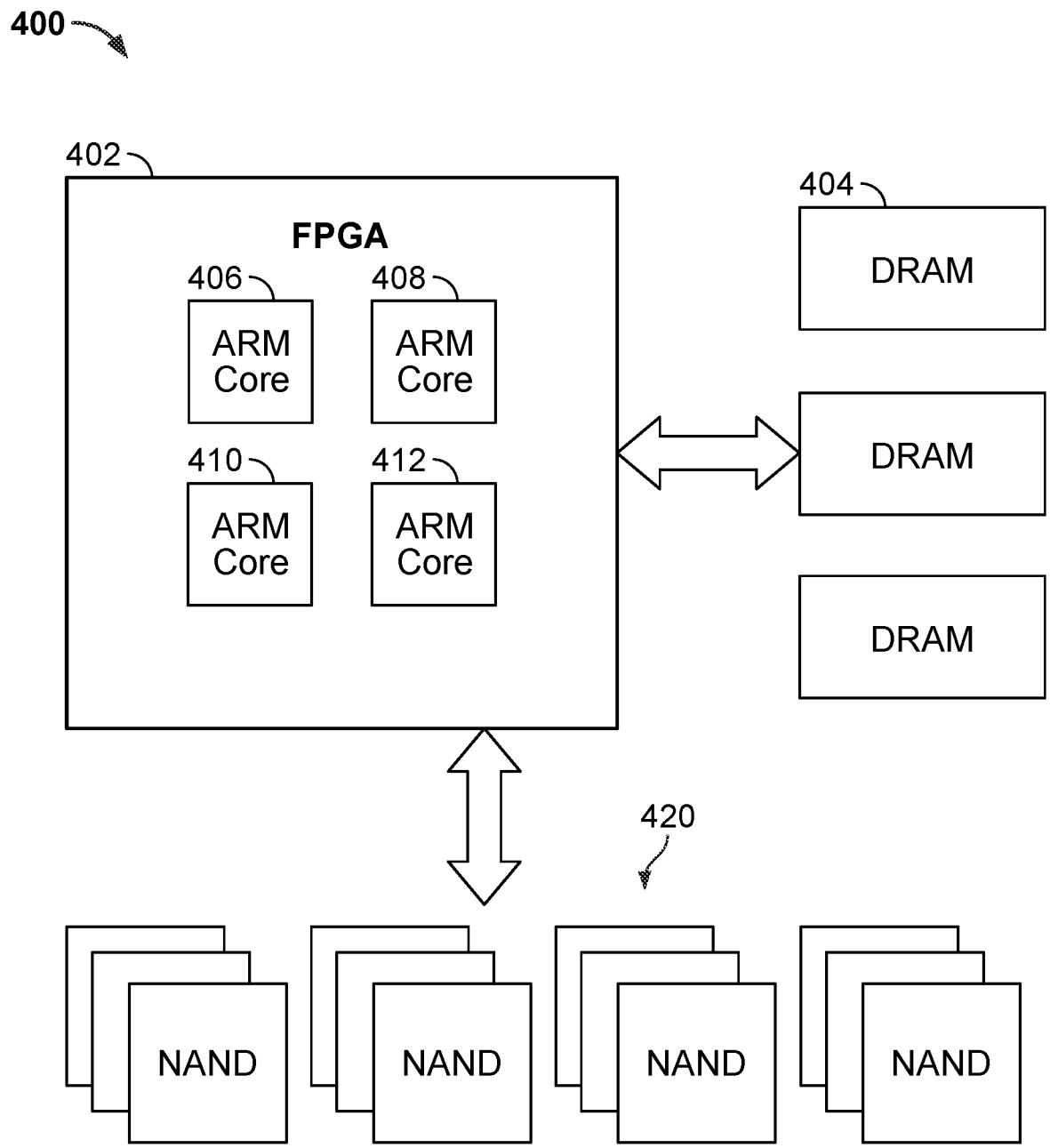
FIG. 4A illustrates the resource allocation of an example configurable multi-function device in a dedicated mode.
Figure 4B:
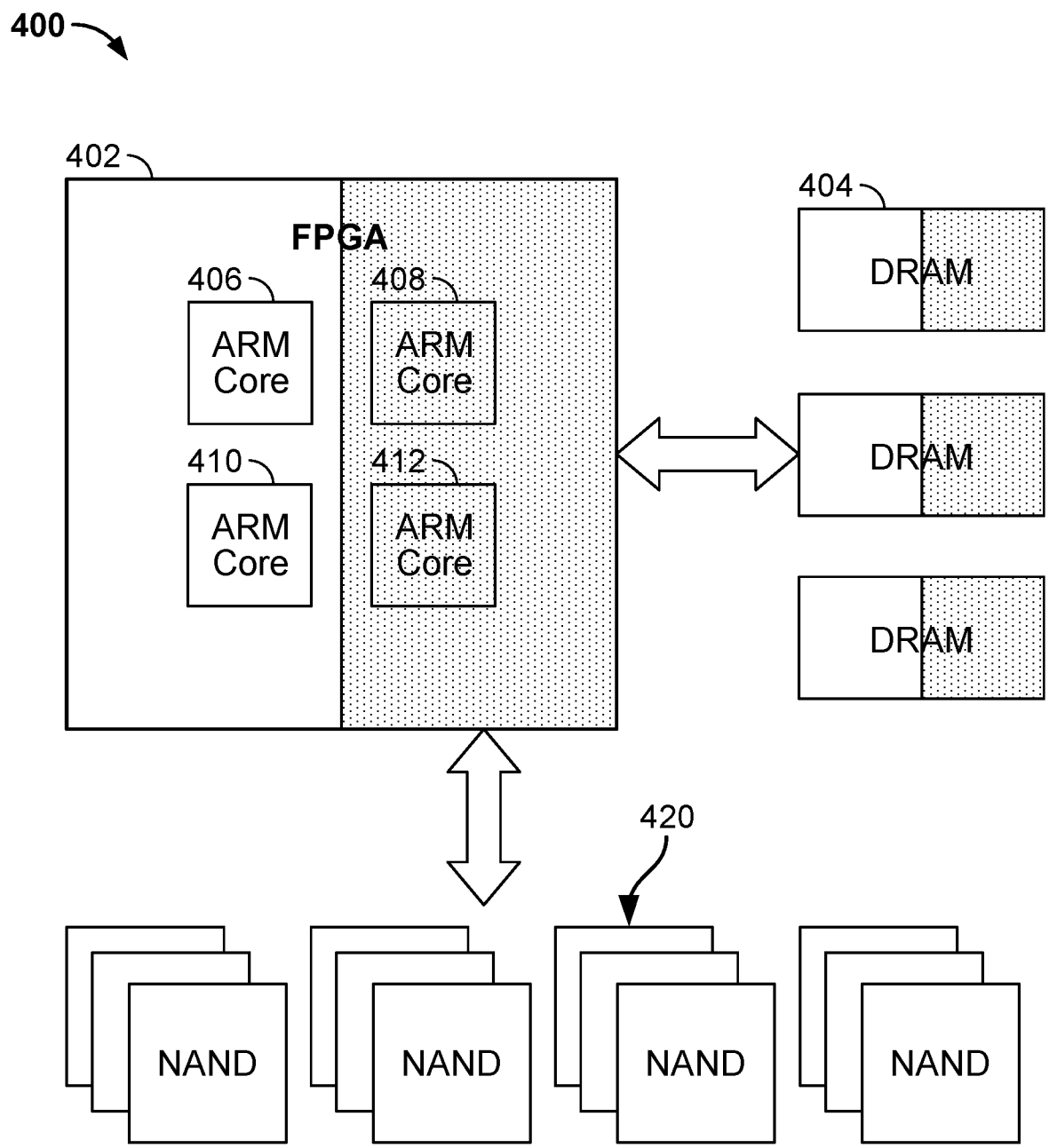
FIG. 4B illustrates the resource allocation of the example configurable multi-function device in a shared mode.

FIGS. 4A and 4B are block diagrams illustrating resource allocations of another embodiment of a configurable multi-function device in different modes. The sharing of the hardware resources of an example device is illustrated.

FIG. 4A illustrates the resource allocation of an example configurable multi-function device in a dedicated mode. In the example shown, device 400 supports heterogeneous computing since it includes multiple types of computing resources such as FPGA 402 and DRAM 404. FPGA 402 includes processor cores (specifically, ARM cores 406-412) in addition to logic cells (not shown). The FPGA logic cells can be used to implement register translation level (RTL) or other higher level code in hardware. The ARM cores and DRAM can be configured to implement firmware code, provide storage, etc. In the dedicated mode, the logic cells, the ARM cores, and onboard DRAM are configured to implement controller functions for managing storage elements (in this case, NAND flash 420), such as read, write, reset, garbage collection, etc.

FIG. 4B illustrates the resource allocation of the example configurable multi-function device in a shared mode. In this example, portions of hardware reconfigured to implement data processing functions are shown with shading. The amount of hardware that is reconfigured depends on the data processing functions being implemented.

In addition to or instead of reprogramming a part of the logic cells (not shown) in the FPGA to implement data processing functions, some of the ARM cores (e.g., 408 and 412) are loaded with firmware code implementing the desired data processing functions. The data processing functions can be simple routines such as comparison, sort, etc., as well as more complex operations such as signal processing, recognition, etc. The data processing functions are preferably performed on data stored in NAND flash 420.

Further, a portion of the DRAM is also released from the controller and reused to support the data processing functions. Because a smaller amount of DRAM is available to implement controller functions, the controller's address mapping is modified to ensure that the storage functions will be able to properly access the storage cells in NAND flash 420. Details of the modified address remapping are discussed below in connection with FIGS. 6A and 6B.

Figure 5:
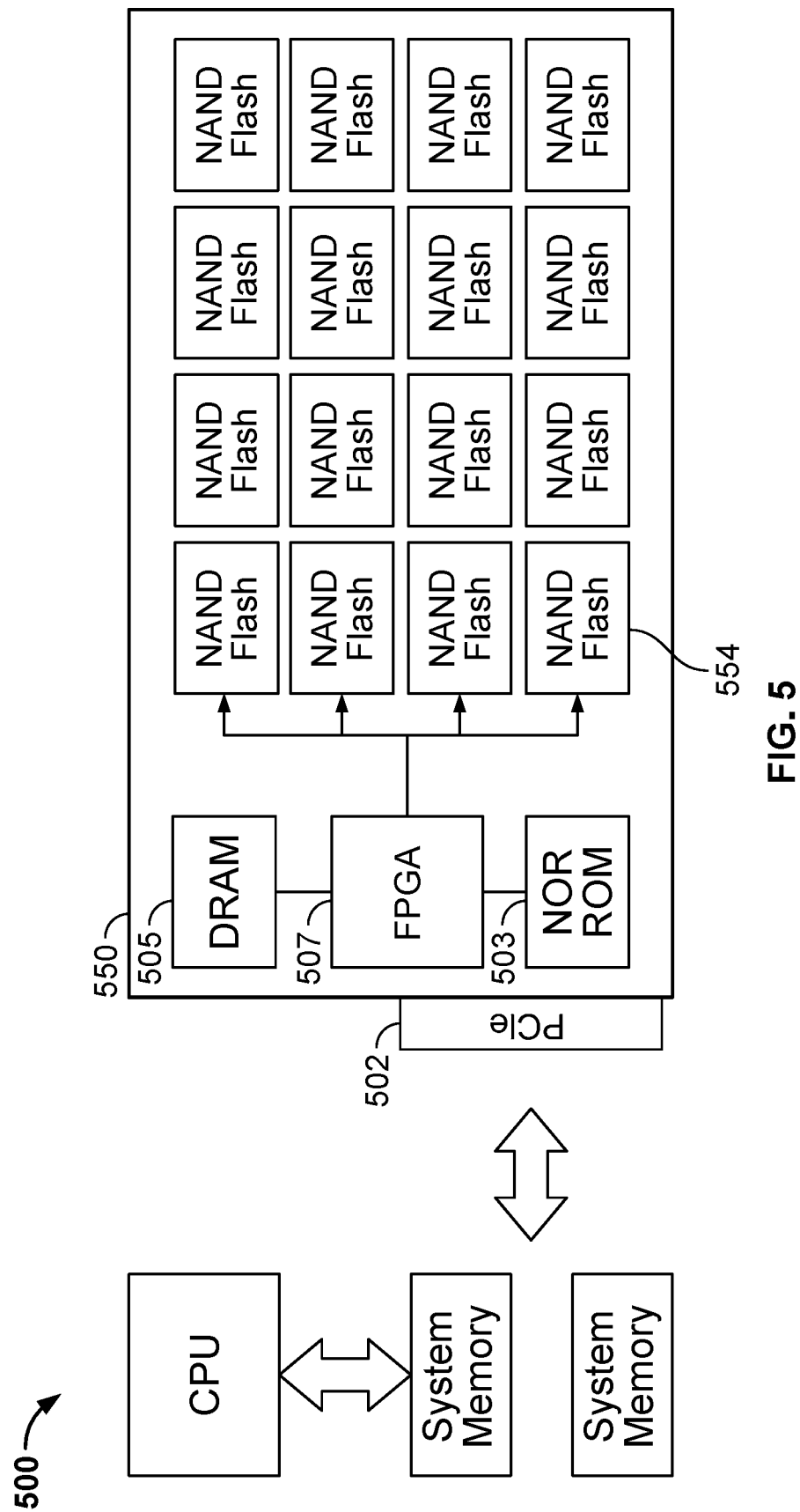
FIG. 5 is a block diagram illustrating another embodiment of a configurable multi-function device.

FIG. 5 is a block diagram illustrating another embodiment of a configurable multi-function device. In this example, device 500 is a storage device comprising one or more storage modules 550. Storage module 550 includes a front-end interface, in this case a PCIe interface 502, configured to communicate with the CPU and system memory of the host system. Device 500 further includes a plurality of local elements, in this case NAND flash elements 554 used to store data. Device 500 further includes DRAM 505 and FPGA 507 (the configurable resource), which in the dedicated mode are configured to only perform storage controller functions for managing data storage on storage elements such as NAND flashes, and in shared mode are partly configured to perform storage controller functions and partly configured to perform data processing functions of data stored on the NAND flashes. A persistent memory 503 (in this case, a NOR flash) is configured to store logic implementations (e.g., executables and/or logical image for code that performs controller functions, special data processing functions such as search or translation algorithms, as well as general purpose functions such as comparison, sorting, etc.) used by the FPGA and DRAM in different modes.

For purposes of illustration, storage devices are discussed in detail in examples herein, although the techniques are also applicable to other specialized data handling devices. For example, if device 500 were a networking device rather than a storage device, it can include network processors instead of or in addition to NAND flashes. In dedicated mode, a network controller implemented using configurable resources such as on-board FPGA and/or DRAM will control the network processors to perform networking functions such as routing, security, etc.; in shared mode, a portion of the shared resources will continue to serve as the network controller, while another portion of the shared resources will be reconfigured to perform other types of data processing such as image processing, translation, etc.

Figure 6A:
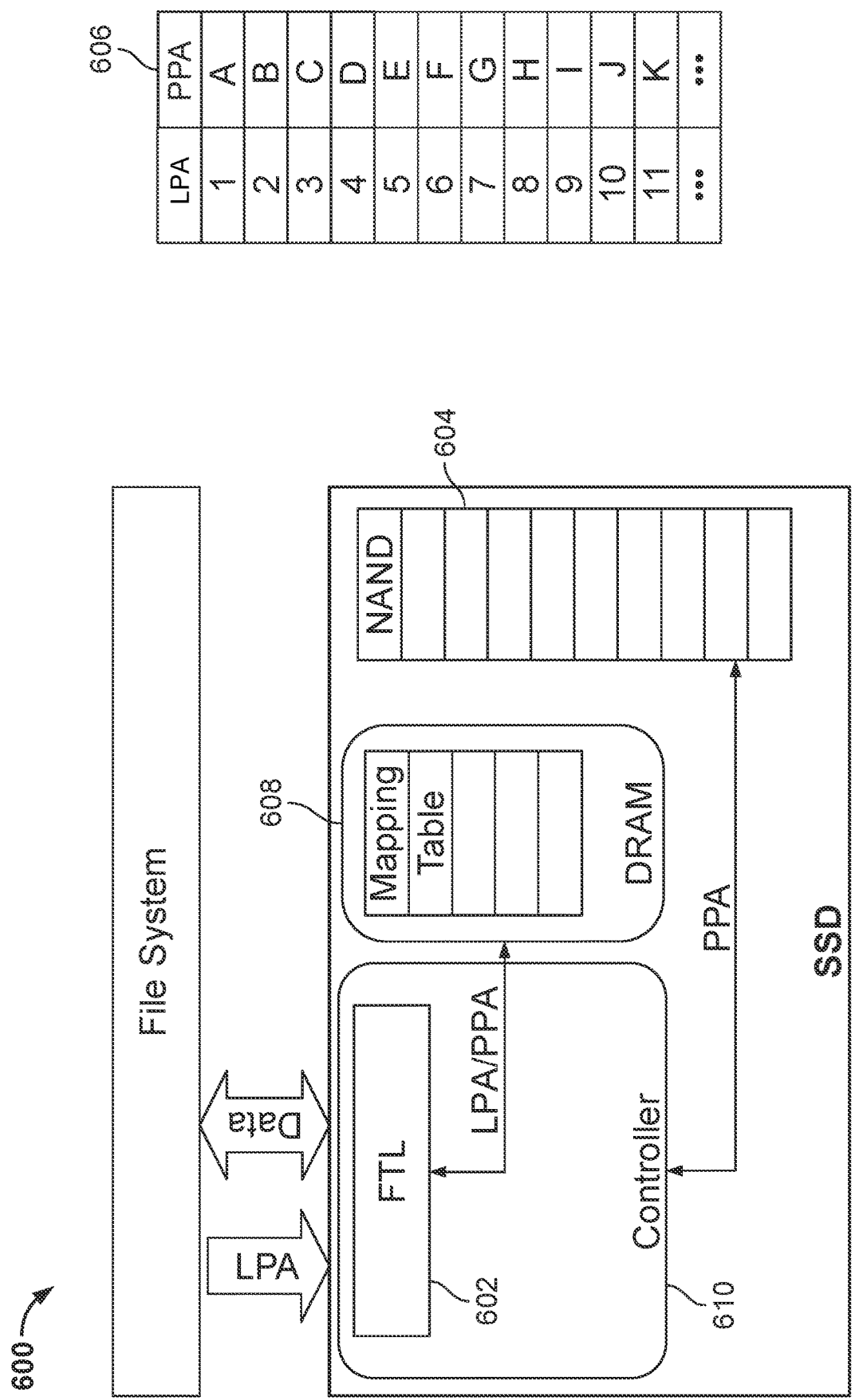
FIG. 6A illustrates how address translation takes place in an embodiment of a storage system in a dedicated mode.
Figure 6B:
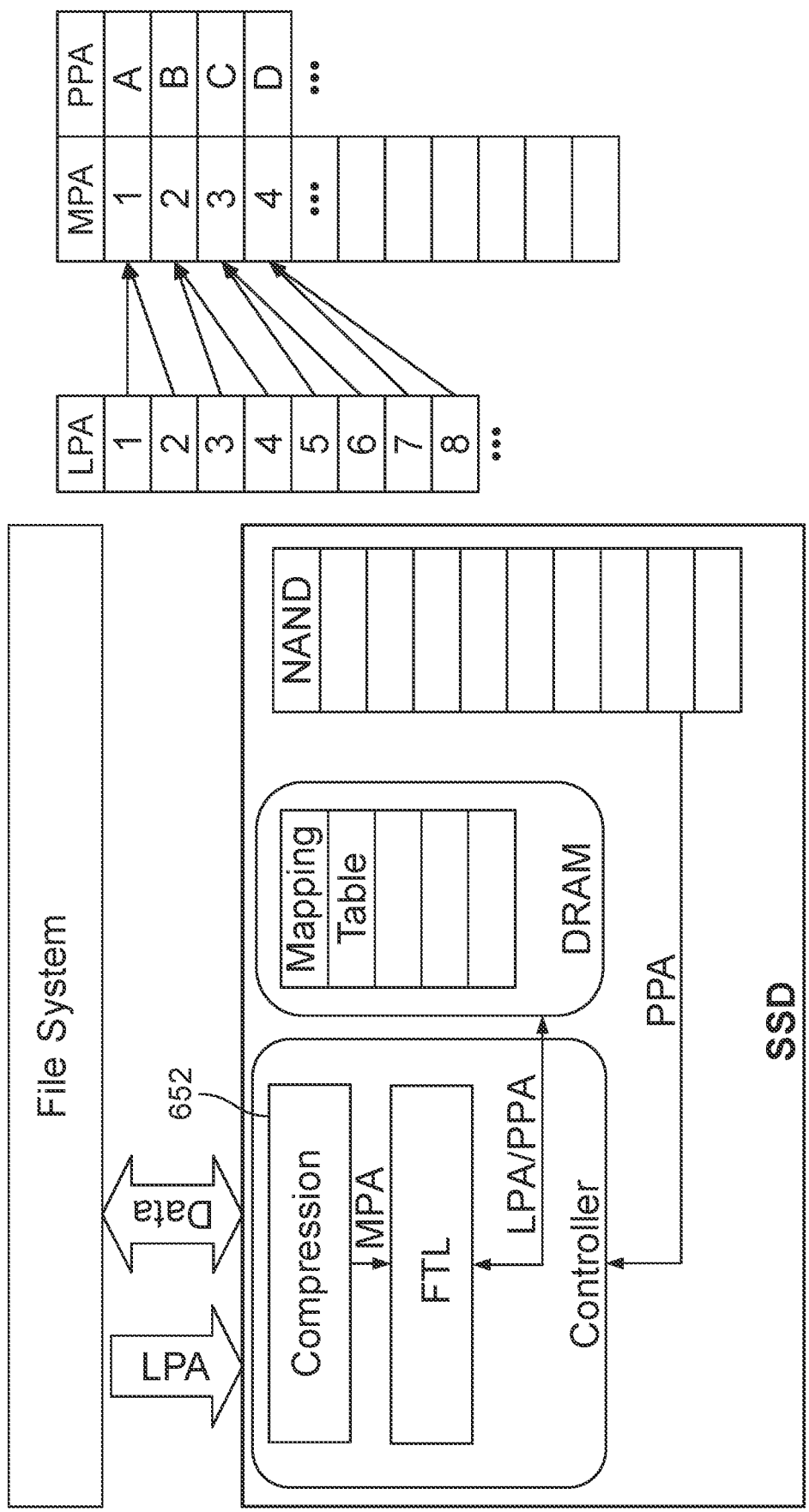
FIG. 6B illustrates how the modified address translation takes place in an embodiment of a storage system in a shared mode.

As discussed above in connection with FIG. 4B, in the shared mode, some of the DRAM is released from the controller and used to support data processing. Since a smaller amount of DRAM is available to implement controller functions than in the dedicated mode, the controller's address mapping scheme (or equivalently, logical page address to physical page address translation scheme) is modified to ensure that the storage module with its NAND flashes will work properly. FIGS. 6A and 6B are diagrams illustrating the controller's address mapping in two modes.

FIG. 6A illustrates how address translation takes place in an embodiment of a storage system in a dedicated mode. When a host file system reads from or writes to a page in memory, the page address used by the host file system is referred to as the logical page address (LPA). Controller 610 of configurable multi-function device 600 includes a flash translation layer (FTL) 602, configured to receive the LPA from the host file system and translate the LPA into a physical page address (PPA) used to access NAND flash 604. In the dedicated mode, a conventional logic page address to physical page address mapping table 606 is used. In this table, each LPA maps to a single PPA. Mapping table 606 is stored in DRAM 608. To translate an LPA into a PPA, the FTL looks up the LPA in mapping table 606 to find the corresponding PPA. If the LPA is not found in the mapping table, a new PPA is allocated and a new entry mapping the LPA to the new PPA is added to table 606.

FIG. 6B illustrates how the modified address translation takes place in an embodiment of a storage system in a shared mode. In this example, a portion of DRAM is freed from the controller and the amount of DRAM available to store the LPA-to-PPA table is less than in dedicated mode. To ensure that the physical cells are still accessible to the host file system, a compressed address mapping table is used. The controller performs a compression function 652 to map multiple LPAs to a single media page address (MPA). In this case, the FTL implements an MPA-to-PPA mapping table, which maps each MPA to a corresponding PPA. A pre-specified scheme determines the offset a particular LPA has relative to its corresponding PPA. For example, suppose that the compression function maps two neighboring LPAs to the same MPA, which in turn maps to a PPA. The pre-specified scheme specifies that the first LPA has an offset of 0 relative to the PPA and the second LPA has an offset of 4 KB relative to the PPA. LPA 1 and LPA 2 both map to MPA 1, which corresponds to PPA A. According to the pre-specified scheme, LPA 1 and LPA 2 map to physical addresses at offsets of 0 and 4 KB relative to PPA A, respectively. As another example, LPA 3 and 4 both map to MPA 2, which corresponds to PPA B. According to the pre-specified scheme, LPA 3 and LPA 4 map physical addresses at offsets of 0 and 4 KB relative to PPA B, respectively. In this example, because the mapping of LPA to MPA is 2-to-1, the amount of memory required to implement the table used by the FTL is half the size as in FIG. 6A.

In another example, suppose the compression function maps four neighboring LPAs to the same MPA with 4 KB offset. Thus, LPAs 1, 2, 3, and 4 map to MPA 1 and therefore PPA A, with offsets of 0, 4 KB, 8 KB, and 12 KB, respectively; LPAs 5, 6, 7, and 8 map to MPA 2 and therefore PPA B, with offsets of 0, 4 KB, 8 KB, and 12 KB, respectively; etc. Many different compression functions and mapping schemes are possible. In some embodiments, given an LPA, the compression function looks up a corresponding MPA, then a modulo function of the LPA is computed to determine the corresponding offset (e.g., a remainder of 0 corresponds to an offset of 0 KB relative to the MPA, a remainder of 1 corresponds to an offset of 4 KB relative to the MPA, etc.). In this example, the mapping of LPA to MPA is 4-to-1, and the amount of memory required to implement the table used by the FTL is ¼ the size as in FIG. 6A.

Figure 7:
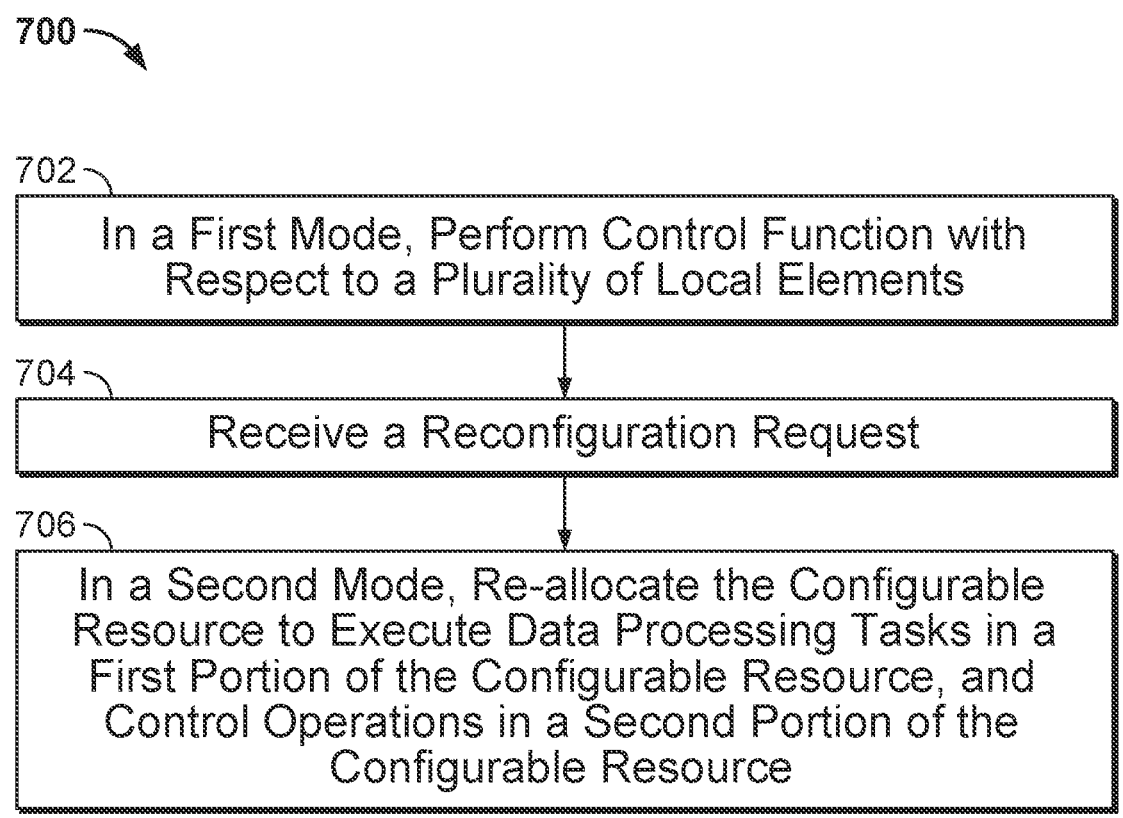
FIG. 7 is a flowchart illustrating an embodiment of a process for managing data in an embodiment of a configurable multi-function device.

FIG. 7 is a flowchart illustrating an embodiment of a process for managing data in an embodiment of a configurable multi-function device. Process 700 can be performed on a configurable multi-function device such as 300, 400,

500, or 600. A microprocessor or the like can be used to instruct the configurable resource to enter into different modes and configurations.

At 702, in a first mode (the dedicated mode), control function is performed with respect to a plurality of local elements. Depending on the type of device, the local elements can be NAND flash, network processors, etc., and the control functions are used to control how the local elements handle data. For example, storage control functions control NAND flashes on a storage drive, network control functions control network processors on a networking device, etc.

At 704, a reconfiguration request is received. In various embodiments, the reconfiguration request can be made manually by a user, or automatically by the host or other device in response to a change in resource requirements (e.g., when data processing applications are launched). In response to the reconfiguration request, the device switches to a second mode (the shared mode).

At 706, in the second mode, the resources are re-allocated such that one or more data processing tasks are executed in a first portion of the configurable resource, and one or more controller operations are executed in a second portion of the configurable resource in connection with the plurality of local elements. For example, certain FPGA cells and/or DRAM configured to perform controller operations in the first mode are reconfigured to perform one or more data processing tasks in the second mode.

Figure 8:
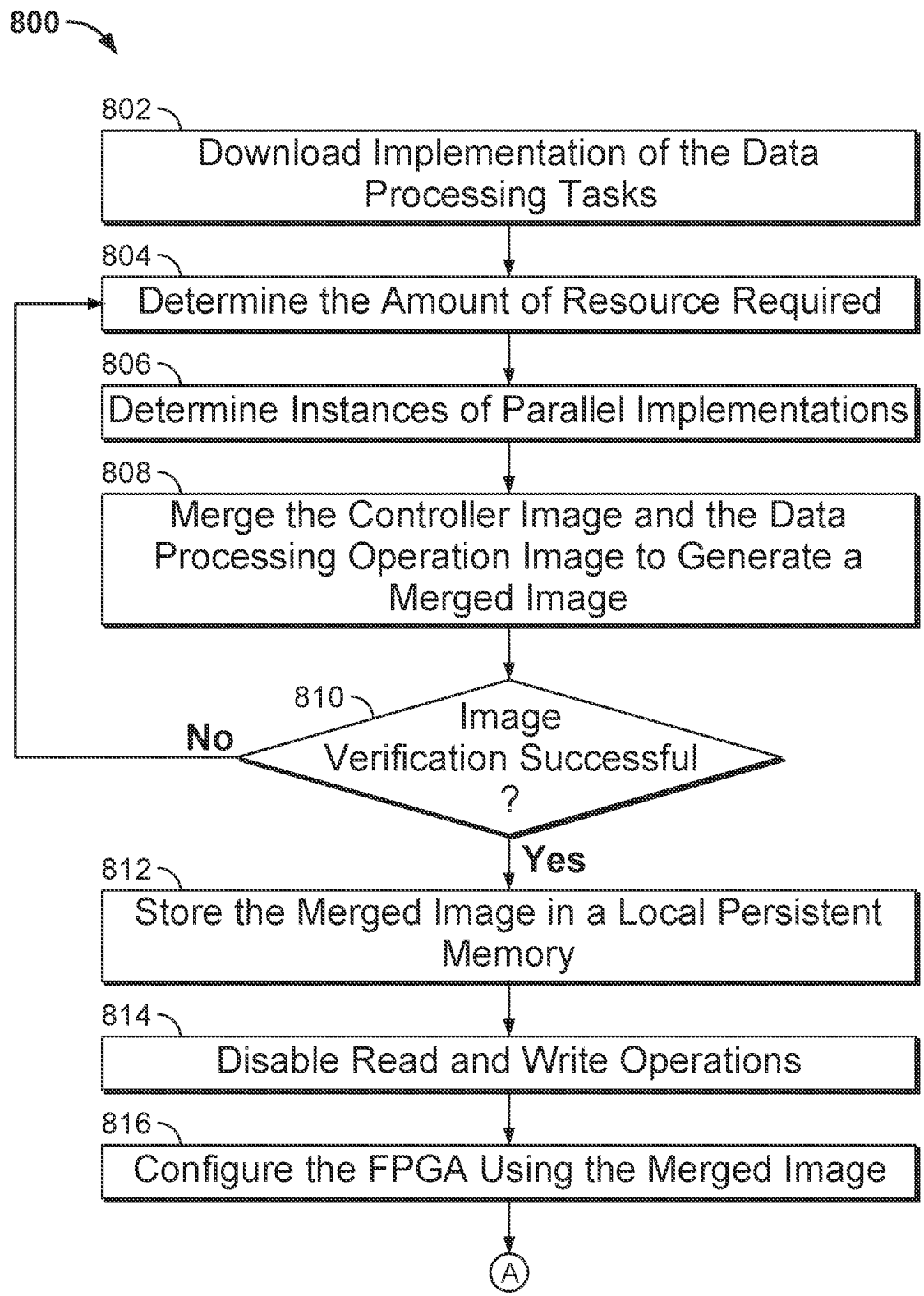
FIG. 8 is a flowchart illustrating an embodiment of a process for reconfiguring a multi-function device from a first mode to a second mode.
Figure 8:
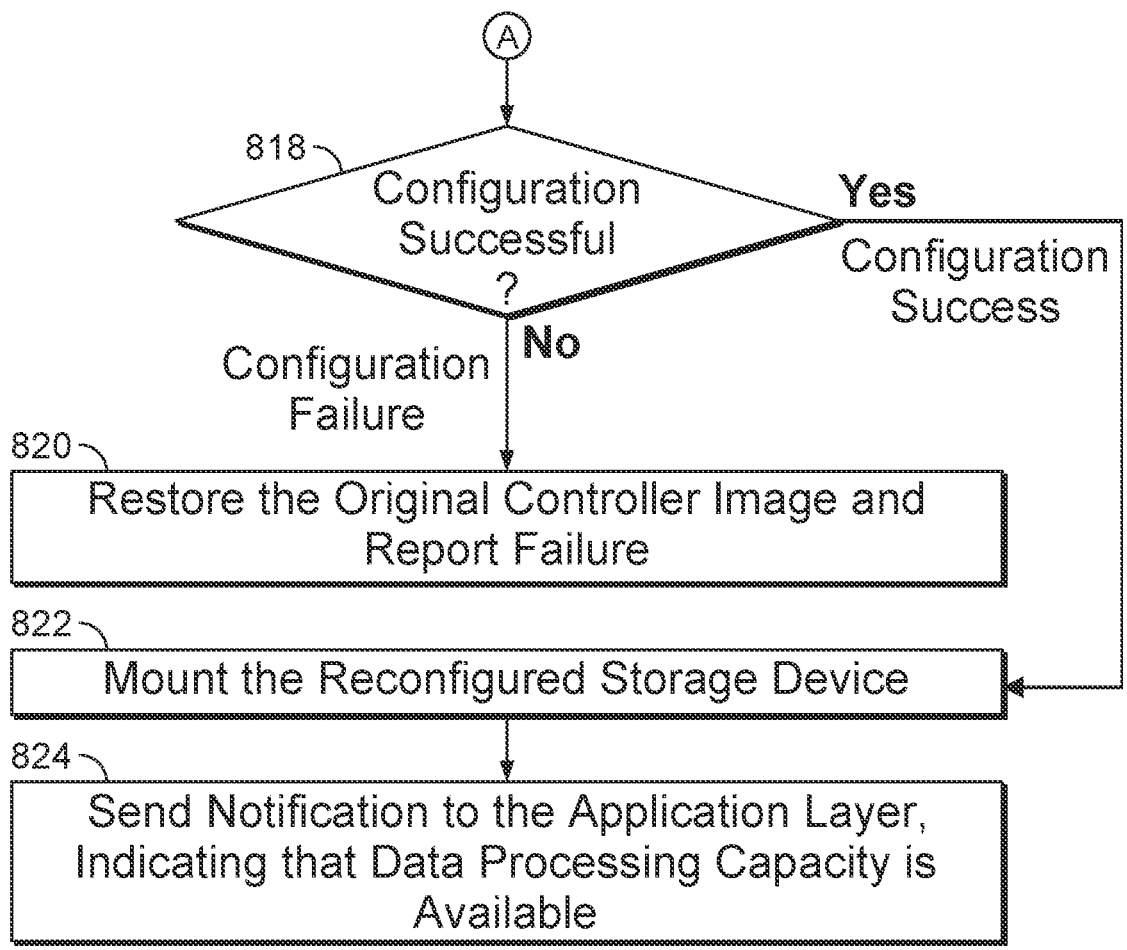

FIG. 8 is a flowchart illustrating an embodiment of a process for reconfiguring a multi-function device from a first mode to a second mode. Process 800 can be performed on a device such as 300, 400, 500, or 600, and be used to implement 706 of process 700.

When the device is powered up, it initially operates in a first mode, as a special purpose device configured to perform certain data handling operations. A storage device is discussed in detail for purposes of this example. The configurable resource of the device is used to implement storage controller functions. As discussed above, the system implements an application layer that includes various application processes, at least some of which are configured to execute on the storage device. For example, when certain application processes need to perform data processing operations on data stored on the storage device, the device is to be reconfigured, and process 800 initiates.

At 802, the implementation of one or more data processing tasks is downloaded onto the device. A data processing task includes one or more data processing operations. In some embodiments, a data processing task can be divided into multiple portions comprising computation-intensive data processing operations such as comparison, sort, etc. For example, a task to identify a maximum value among many values can be divided into multiple comparison operations. As another example, a task to perform image or speech recognition can be divided into convolution operations of a stream of data with an FIR filter. In some embodiments, at least some of the operations are specified using RTL, C, or other higher level programming languages, and compiled into an FPGA image (e.g., a layout map) that can be implemented in FPGA hardware. In some embodiments, at least some of the operations are implemented as firmware code to be executed on an ARM core.

The implementation of the data processing tasks can be stored at any appropriate location, such as on a separate drive on the network, on a local flash storage element, etc. In this example, the application layer provides the device with an address for locating the implementation to download (e.g., as an IP address, a URL, a file directory path, etc.). The implementation is downloaded into a local storage location (e.g., NOR flash 503 of FIG. 5), ready to be loaded onto the configurable resource such as the FPGA.

At 804, the amount of resource required is determined based on the downloaded implementation. The amount of resource required depends on hardware layout, such as the hardware layout specified by the FPGA map. For example, an FPGA map implementing a sort function can specify a resource requirement of 100 logic cells. Thus, at least 100 logic cells need to be reconfigured.

At 806, instances of parallel implementations are determined, subject to logic cell availability. For example, suppose that the device has a total of 1500 logic cells, the controller requires a minimum of 1000 logic cells to maintain its required throughput, and the downloaded implementation of a sort function requires 100 logic cells. Thus, 500 logic cells can be freed up and made available to implement 5 instances of parallel implementations of the sort function.

In this example, the FPGA used by the device cannot be partially reprogrammed. In other words, in order to update a portion of the FPGA, the entire FPGA needs to be reprogrammed. Thus, at 808, the controller image and the data processing task image are merged to form a new, merged image used to reprogram the FPGA. A merge tool provided by the FPGA manufacturer can be used to generate the merged image. In embodiments where the FPGA (and/or other configurable resource) is capable of being partially reprogrammed, 808 can be omitted.

At 810, the merged image is verified using a verification tool, such as one provided by the FPGA manufacturer. The verification result indicates whether the merged image can be used to reprogram the FPGA.

If the verification is unsuccessful, the process returns to 804, and 804-810 are repeated until a successfully verified image is generated.

If the verification is successful, the process proceeds to 812 where the merged image is written into a local persistent memory. In this case, the merged image is written to a local NOR flash. Storing the merged image into NOR flash gives more protection against the situation where the image stored in SRAM (which is the merged image used by the FPGA) becomes corrupt. Should the image stored in the SRAM become corrupt, the FPGA's parity check process will find errors, and the copy stored in the NOR flash can be loaded into the SRAM to replace the corrupted copy.

At 814, all read and write operations on the drive are disabled. A system call can be issued to the host to disable the read and write operations and prevent data access while the reconfiguration is in progress.

At 816, the FPGA is configured (e.g., reprogrammed) using the merged image. The reprogramming can be accomplished using tools provided by the FPGA's manufacturer.

At 818, it is determined whether the configuration is successful. In this example, an onboard verification mechanism provided by the FPGA manufacturer is used to make the determination.

If the configuration is unsuccessful, at 820, the original controller image is restored. Further, since the failure indicates that there is something wrong with the device, the device is placed into a read-only mode to prevent further data corruption, and the failure is reported as a log, an alert, a message, or the like. The process terminates at this point.

If the configuration is successful, at 822, the reconfigured storage device (with its offloaded processor and storage controller) is mounted. Once the device is mounted as a drive on the network, the host can reinitiate read and write operations to the storage device, although the throughput will be lower than before.

At 824, a notification is sent to the application layer that made the request for the reconfiguration, indicating that data processing capacity has become available. Upon receiving the notification, the application layer can send a request to initiate data processing on locally stored data using the reconfigured FPGA.

In some embodiments, the data processing functions require firmware support in addition to FPGA logic. Thus, after the FPGA is deemed as being reconfigured successfully at 818, appropriate firmware code is downloaded and developed (e.g., loaded) on configurable processors, and executed in connection with the data processing functions.

In this example, the data processing is performed on data stored in the local storage such as the NAND flash to reduce traffic on the network. After the data processing work is done, the device is restored to its original state (e.g., as a dedicated storage device) and to perform its specialized data handling functions at full speed. In other words, the device exits the sharing mode and re-enters the dedicated mode.

Figure 9:
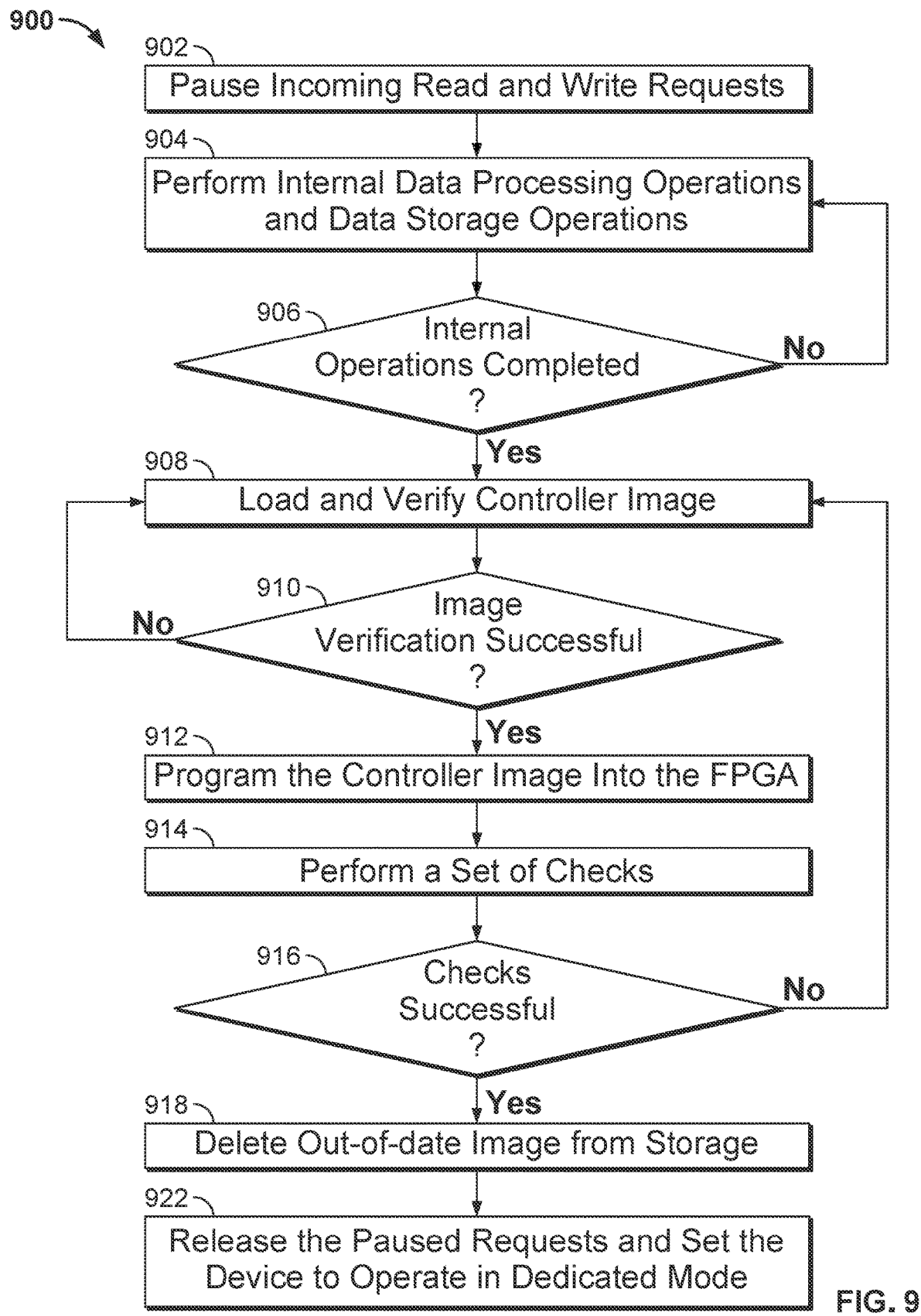
FIG. 9 is a flowchart illustrating an embodiment of a process for restoring the controller function.

FIG. 9 is a flowchart illustrating an embodiment of a process for restoring the controller function. Process 900 can be performed on a device such as 300, 400, or 500, after a process such as 800 is carried out. Upon completion of the data processing functions, the application layer notifies the device to start restoring the resources.

At 902, incoming read and write requests (I/O requests) are paused. In some embodiments, a notification (e.g., a system call, a message, etc.) is sent to the host, instructing the host not to send new I/O requests. Meanwhile, the controller processes and completes all existing requests, or buffers the existing requests to be processed at a later time.

At 904, current internal operations such as data processing operations and data storage operations are performed. The configurable multi-function device continues to perform its pending operations in the shared mode. Different functions can be performed independently by different parts of the FPGA.

At 906, it is checked whether the current internal operations are completed. If the current internal operations are not completed, the process returns to 904 until all current internal operations are completed. If, however, the current internal operations are completed, the process proceeds to 908 where the controller image is loaded from a storage location and verified. In this case, the controller image is retrieved from its storage location in the persistent memory of the device (e.g., the NOR flash) and verified using verification tools provided by the FPGA manufacturer.

At 910, it is determined whether the verification is successful. In this example, the output of the verification tool is checked. An unsuccessful verification indicates that the controller image includes errors. Thus, the process returns to 908 where the controller image is loaded from a secondary storage location and verified again. In this case, the controller image is loaded from a NAND flash, which is the secondary storage storing an independent copy of the controller image. Other levels of backup storage locations for the controller image can be provided, such as on other storage devices (e.g., a RAID, a disk drive, etc.) on the network. 908 and 910 are repeated and these backup storage locations are tried successively, and the controller image is loaded from other storage locations and verified until a controller image that passes the verification is found.

If the verification is successful, at 912, the controller image is programmed into the FPGA. In embodiments where the FPGA does not support partial reprogramming, the entire FPGA can be reprogrammed with the new controller image. In embodiments where the FPGA supports partial programming, the portion previously programmed to perform data processing tasks can be reprogrammed with the controller image.

At 914, a set of checks for the functions of the programmed controller is performed. In this example, the set of checks include logic equality checks that ensure what is programmed into the FPGA has the correct logic design. These checks can be specified by the manufacturer of the device.

At 916, it is determined if the set of checks is successfully performed. Here, it is assumed that a properly loaded, valid controller image will result in successful checks. If any of the checks is unsuccessful, the process returns to 908, where the controller image is verified again and reloaded if necessary.

If the checks are successful, the process proceeds to 918 where the out-of-date image (e.g., the merged image from 808 of process 800) is deleted from its storage location such as the NOR flash to release capacity.

At 922, the I/O operations previously paused in 902 are resumed, and the device is set to operate in dedicated mode again. In some embodiments, appropriate notifications are sent to other devices about this new status of the device. For a configurable device that is reconfigured into a storage drive, it is available to the host and other devices on the network as a mounted drive for providing storage functionalities. All the FPGA, SRAM, processors, and other configurable resources are used to implement storage-related functions.

Flexibly configuring the resources of a device to operate in different modes and thereby providing computing capabilities has been disclosed. The technique allows resources to be efficiently used and therefore decreases deployment and maintenance costs on the network. Further, because the data being processed is preferably local to the device, there is significantly less data transfer compared to existing methods, and network bandwidth is greatly conserved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a plurality of local elements that are located within the system; and
a plurality of configurable resources coupled to the plurality of local elements, wherein at least a subset of the plurality of configurable resources is comprised in a storage device within the system, the plurality of configurable resources is configured to:
in a first mode, execute a controller operation in connection with the plurality of local elements, wherein the subset of the plurality of configurable resources is dedicated to perform storage controller functions in the first mode; and
in a second mode:
execute a data processing task using a first portion of the configurable resources; and
execute the controller operation in connection with the plurality of local elements, using a second portion of the configurable resources;
wherein:

the subset of the plurality of configurable resources is configured to perform data processing functions of data stored on the storage device when the subset of the plurality of configurable resources is operating in the second mode;

the plurality of configurable resources is configured to switch one or more of the plurality of configurable resources from the first mode to the second mode in response to a request that is made in response to a determination that one or more predefined applications is invoked, the one or more predefined applications comprising one or more data processing applications;

to switch the one or more of the plurality of configurable resources from the first mode to the second mode includes loading code pertaining to data processing from a predefined storage location, and using the code to reprogram the one or more of the plurality of configurable resources to implement the data processing functions; and in connection with switching the one or more of the plurality of configurable resources from the first mode to the second mode, an address mapping is modified to provide access to a storage medium via another subset of the plurality of configurable resources that are not switched to the second mode.

2. The system of claim 1, wherein the plurality of configurable resources include a field programmable gate array (FPGA), a complex programmable logic device (CPLD), or both.

3. The system of claim 1, wherein the plurality of configurable resources include a field programmable gate array (FPGA) that comprises a plurality of logic cells and a plurality of processor cores.

4. The system of claim 1, wherein the plurality of configurable resources include:
a field programmable gate array (FPGA) that comprises a plurality of logic cells and a plurality of processor cores; and
a plurality of dynamic random access memories (DRAMs).

5. The system of claim 1, wherein the plurality of local elements includes a plurality of storage elements, a plurality of network processors, or a combination of storage elements and network processors.

6. The system of claim 1, wherein the plurality of local elements includes a plurality of NAND flash elements.

7. The system of claim 1, wherein the data processing task is performed on data stored in at least some of the local elements.

8. The system of claim 1, wherein the data processing task includes analysis of data stored in at least some of the local elements.

9. The system of claim 1, wherein the code pertaining to data processing is loaded into at least the first portion of the configurable resource when the subset of the plurality of configurable resources is switched to the second mode.

10. The system of claim 1, wherein:
one or more of the plurality of configurable resources are further configured to, in the second mode, perform a modified logical page address to physical page address translation;
multiple logical address pages map to a single media page address based at least in part on a compression function.

11. The system of claim 10, wherein the single media page address is mapped to a physical page address.

12. The system of claim 1, wherein in the first mode, the plurality of configurable resources is dedicated to executing the controller operation.

13. The system of claim 1, wherein the plurality of configurable resources is configured to switch one or more of the plurality of configurable resources from the first mode to the second mode further in response to a determination the data processing task to be performed is comprised in a predefined set of processing tasks.

14. The system of claim 1, wherein the local data is local with respect to the plurality of configurable resources.

15. The system of claim 1, wherein in response to the one or more of the plurality of configurable resources being switched to the second mode, a verification is performed to confirm that the one or more of the plurality of configurable resources are operable in the second mode before the one or more of the plurality of configurable resources are used to perform data processing functions of data stored on the storage device in the second mode.

16. A method of resource management, comprising:
operating in a first mode, including executing a controller operation in connection with a plurality of local elements that are located within a system, wherein the controller operation is executed by a plurality of configurable resources, at least a subset of the plurality of configurable resources is comprised in a storage device within the system, and the subset of the plurality of configurable resources is dedicated to perform storage controller functions in the first mode;
in response to a request that is made in response to a determination that one or more predefined applications is invoked, the one or more predefined applications comprising one or more data processing applications; and
operating in the second mode, including:
executing a data processing task in a first portion of the configurable resources; and
executing the controller operation in connection with the plurality of local elements, in a second portion of the configurable resources;
wherein:
the subset of the plurality of configurable resources is configured to perform data processing functions of data stored on the storage device when the subset of the plurality of configurable resources is operating in the second mode;
switching the one or more of the plurality of configurable resources from the first mode to the second mode includes loading code pertaining to data processing from a predefined storage location, and using the code to reprogram the one or more of the plurality of configurable resources to implement the data processing functions; and
in connection with switching the one or more of the plurality of configurable resources from the first mode to the second mode, an address mapping is modified to provide access to a storage medium via another subset of the plurality of configurable resources that are not switched to the second mode.

17. The method of claim 16, wherein the plurality of configurable resources include a field programmable gate array (FPGA), a complex programmable logic device (CPLD), or both.

18. The method of claim 16, wherein the plurality of configurable resources include a field programmable gate array (FPGA) that comprises a plurality of logic cells and a plurality of processor cores.

19. The method of claim 16, wherein the plurality of configurable resources include:
a field programmable gate array (FPGA) that comprises a plurality of logic cells and a plurality of processor cores; and
a plurality of dynamic random access memories (DRAMs).

20. The method of claim 16, wherein the plurality of local elements includes a plurality of storage elements, a plurality of network processors, or a combination of storage elements and network processors.

21. The method of claim 16, wherein the plurality of local elements includes a plurality of NAND flash elements.

22. The method of claim 16, wherein the data processing task is performed on data stored in at least some of the local elements.

23. The method of claim 16, wherein the data processing task includes analysis of data stored in at least some of the local elements.

24. The method of claim 16, wherein switching from the first mode to the second mode includes loading the code pertaining to data processing into at least the first portion of the plurality of configurable resources.

25. The method of claim 16, further comprising, in the second mode, performing a modified logical page address to physical page address translation, wherein multiple logical address pages map to a single media page address based at least in part on a compression function.

26. A computer program product for resource management, the computer program product being embodied in a tangible non-transitory computer readable storage medium and comprising computer instructions for:
operating in a first mode, including executing a controller operation in connection with a plurality of local elements that are located within a system, wherein the controller operation is executed by a plurality of configurable resources, at least a subset of the plurality of configurable resources is comprised in a storage device within the system, and the subset of the plurality of configurable resources is dedicated to perform storage controller functions in the first mode;
in response to a request that is made in response to a determination that one or more predefined applications is invoked, the one or more predefined applications comprising one or more data processing applications; and
operating in the second mode, including:
executing a data processing task in a first portion of the configurable resources; and
executing the controller operation in connection with the plurality of local elements, in a second portion of the configurable resources;
wherein:
the subset of the plurality of configurable resources is configured to perform data processing functions of data stored on the storage device when the subset of the plurality of configurable resources is operating in the second mode;
switching the one or more of the plurality of configurable resources from the first mode to the second mode includes loading code pertaining to data processing from a predefined storage location, and using the code to reprogram the one or more of the plurality of configurable resources to implement the data processing functions;
in connection with switching the one or more of the plurality of configurable resources from the first mode to the second mode, an address mapping is modified to provide access to a storage medium via another subset of the plurality of configurable resources that are not switched to the second mode.

* * * * *